United States Patent
Lee et al.

(10) Patent No.: US 9,529,436 B2
(45) Date of Patent: Dec. 27, 2016

(54) HAPTIC ACTUATOR INTEGRATED WITH SENSOR ELECTRODE AND WEARABLE DEVICE COMPRISING THE SAME

(71) Applicant: IMAGIS CO., LTD., Gyeonggi-do (KR)

(72) Inventors: Jae Sun Lee, Gyeonggi-do (KR); Jung Young Nam, Gyeonggi-do (KR); Hyun Joo Lee, Seoul (KR); Ki Hyun Kim, Gyeonggi-do (KR)

(73) Assignee: IMAGIS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/941,901

(22) Filed: Nov. 16, 2015

(65) Prior Publication Data

US 2016/0139668 A1     May 19, 2016

(30) Foreign Application Priority Data

Nov. 18, 2014   (KR) ........................ 10-2014-0161201

(51) Int. Cl.
    *G06F 3/01*    (2006.01)
(52) U.S. Cl.
    CPC .................................... *G06F 3/016* (2013.01)
(58) Field of Classification Search
    CPC ..... G06F 3/016; A61B 5/0002; A61B 5/0004; A61B 5/0008; A61B 5/0024; A61B 5/021; A61B 5/0205
    USPC ............... 340/407.1, 539.11, 539.12, 573.1, 340/286.07, 582; 128/903–94; 600/300–301
    See application file for complete search history.

(56) References Cited

U.S. PATENT DOCUMENTS

| | | | | |
|---|---|---|---|---|
| 9,060,683 | B2 * | 6/2015 | Tran ..................... | A61B 5/0022 |
| 2011/0245633 | A1 * | 10/2011 | Goldberg ............... | A61B 5/681 |
| | | | | 600/301 |
| 2014/0316229 | A1 * | 10/2014 | Tognetti ............... | A61B 5/0205 |
| | | | | 600/383 |
| 2015/0130613 | A1 * | 5/2015 | Fullam ............... | G08B 21/0453 |
| | | | | 340/539.12 |
| 2016/0058375 | A1 * | 3/2016 | Rothkopf ............... | A61B 5/681 |
| | | | | 600/301 |

FOREIGN PATENT DOCUMENTS

| | | | | |
|---|---|---|---|---|
| JP | 2010-92071 | 4/2010 | ............. | G03B 17/02 |
| JP | 2013-121369 | 6/2013 | ........... | A61B 5/0488 |
| KR | 10-2003-0040316 | 5/2003 | ............... | G06F 3/03 |
| KR | 10-0793079 | 1/2008 | ............... | G06F 3/01 |
| KR | 10-2009-0043773 | 5/2009 | ............. | G01C 21/34 |

OTHER PUBLICATIONS

Korean Office Action dated Jul. 17, 2015 in KR Patent Application No. 10-2014-0161201 and English translation thereof.

* cited by examiner

*Primary Examiner* — Hung T Nguyen
(74) *Attorney, Agent, or Firm* — Harness, Dickey & Pierce, P.L.C.

(57) ABSTRACT

Disclosed is a haptic actuator integrated with a sensor electrode and a wearable device including the haptic actuator. The haptic actuator integrated with a sensor electrode comprises a case having a skin contact surface made of a conductive material; a vibration generation means installed in the case; a driving signal transmitting means of which the one end is connected electrically to the vibration generation means; and a sensor signal transmitting means of which the one end is connected electrically to the skin contact surface.

17 Claims, 7 Drawing Sheets

HAPTIC ACTUATOR INTEGRATED WITH SENSOR ELECTRODE AND WEARABLE DEVICE COMPRISING THE SAME

CROSS-REFERENCE TO RELATED PATENT APPLICATION

This application claims the benefit of Korean Patent Application No. 10-2014-0161201, filed on 18 Nov. 2014 in the Korean Intellectual Property Office. The entire disclosure of the application identified in this paragraph is incorporated herein by reference.

FIELD

The present disclosure relates to a wearable device, and more particularly to a wearable device for providing various haptic feedbacks by using a haptic actuator integrated with a sensor electrode for detecting biosignals, obtaining various information of a user or controlling external electronic devices by using user's biosignals.

BACKGROUND

In recent times, haptic actuators have been widely used mainly for portable electronic devices, and provide users with various feedbacks in compliance with specific input or predetermined programs for augmented reality and enhanced user experience (UX).

For example, haptic actuators are used to generate vibrations when a mobile phone receives calls or messages, to generate haptic feedbacks when users select a menu through a keypad or touch screen, and to generate a specific haptic feedback when a game program is running.

There are many types of the aforementioned haptic actuators which are generally classified into ERMs (Eccentric Rotating Masses) generating vibration by rotating an eccentric vibration unit by a motor, LRAs (Linear Resonant Actuators) generating vibration by reciprocating a vibration unit connected to a spring by electromagnetic force, and piezoelectric actuators having piezoelectric elements. Among the aforementioned of actuators, the LRAs and the piezoelectric actuators are known faster than the ERMs in terms of response speed, and therefore generally used for providing precise haptic effects.

In addition, another type is haptic actuators which use electrostatic friction or ultrasonic surface friction.

Meanwhile, as there are various types and functions of portable electronic devices, it is a tendency that the scope of using haptic actuators is extended day by day, and the number of haptic actuators used in one electronic device is gradually increasing.

For example, the following Patent 1 discloses a wearable device for navigation to provide drivers or pedestrians with path information as a guide by installing a plurality of haptic actuators in a wrist-worn wearable device and generating various vibration patterns.

In addition, a recent active trend is to study wearable devices equipped with sensors for detecting biosignals. For example, using user's EMG (Electromyogram) signals, EEG (Electroencephalogram) signals, or EOG (Electrooculogram) signals, etc. to check user's health conditions and exercise intensities, or control operation of other electronic devices.

The following Patent 2 discloses a wrist-worn wearable device for creating control signals by using user's muscular changes following hand motions. The following Patent 3 discloses a wrist-worn wearable device for creating control signals by using motions with body vibrations and hand motions.

As described above, considering the trend that the scope of using wearable devices is gradually extended and diversified, the outlook is that the wearable devices will evolve into the direction of developing new functions or enhancing user's experience by using both sensors for detecting biosignals and haptic actuators.

In addition, another outlook is to install more haptic actuators and sensors for detecting biosignals in a wearable device to provide more various haptic effects than conventional effects.

However, since it is essential that a wearable device is small and light enough for users to feel comfortable, the size thereof is unavoidably limited. More sensors and actuators to be installed contribute to insufficient installation spaces, and significantly restrict design freedom.

RELEVANT ART

Patent 1: Korea Patent Publication No. 10-2009-0043773 (published on May 7, 2009)
Patent 2: Korea Patent Publication No. 10-2003-0040316 (published on May 22, 2003)
Patent 3: Korea Patent Registration No. 10-0793079 (published on Jan. 10, 2008)

SUMMARY

In view of the above to address the aforementioned problems, the present disclosure provides a haptic actuator integrated with a sensor electrode for detecting biosignals to enable more haptic actuators and sensors for detecting biosignals to be installed in a wearable device and thereby to provide more various haptic feedbacks and enhanced user experience.

In accordance with an embodiment of the present disclosure to achieve aforementioned objects, there is provided a haptic actuator integrated with a sensor electrode, comprising: a case comprising a skin contact surface made of a conductive material; a vibration generation means installed in the case and for generating vibrations by using electric signals; a driving signal transmitting means of which the one end is connected electrically to the vibration generation means and for sending driving signals to the vibration generation means; and a sensor signal transmitting means of which the one end is connected electrically to the skin contact surface of the case and for sending biosignals detected from the skin contact surface to the outside.

In the haptic actuator integrated with a sensor electrode in accordance with an embodiment of the invention, the case comprises a cylindrical upper case of which the one end is open; and a sensor electrode coupled to the one open end of the upper case and having the skin contact surface; and the sensor signal transmitting means is connected to the sensor electrode.

In the haptic actuator integrated with a sensor electrode in accordance with an embodiment of the invention, the case is a cylindrical shape with one open end and comprises: a sensor electrode having the skin contact surface; and a lower case coupled to one open end of the sensor electrode; and the sensor signal transmitting means is connected to the sensor electrode.

In accordance with another embodiment of the present disclosure, there is provided a haptic actuator integrated with a sensor electrode, comprising a case; a sensor electrode coupled to the outer side of the case for detecting biosignals; a vibration generation means installed in the case and for generating vibrations by using electric signals; a driving signal transmitting means of which the one end is connected electrically to the vibration generation means and for sending driving signals to the vibration generation means; and a sensor signal transmitting means of which the one end is connected electrically to the sensor electrode and for sending biosignals detected by the sensor electrode to the outside.

In the haptic actuator integrated with a sensor electrode in accordance with another embodiment of the present disclosure, the case has a through-hole, and the sensor electrode is inserted into and coupled to the through-hole.

In the haptic actuator integrated with a sensor electrode in accordance with an embodiment or another embodiment of the present disclosure, a signal processing means for amplifying detected biosignals and removing noise from the biosignals is installed in the case.

In addition, in the haptic actuator integrated with a sensor electrode in accordance with an embodiment or another embodiment of the present disclosure, the vibration generation means comprises: a diaphragm installed in the upper case and of which the edge contacts the upper case; a permanent magnet coupled to the diaphragm; and a coil connected electrically to the driving signal transmitting means and for applying electromagnetic forces to the permanent magnet.

In addition, in the haptic actuator integrated with a sensor electrode in accordance with an embodiment or another embodiment of the present disclosure, the vibration generation means comprises a diaphragm installed in the upper case; and a piezoelectric element coupled to one side of the diaphragm and connected electrically to the driving signal transmitting means.

In accordance with another embodiment of the present disclosure, there is provided a wearable device, comprising a wearing means to be equipped on user's body; a haptic actuator integrated with a sensor electrode, coupled to the wearing means and comprising a case comprising a skin contact surface made of a conductive material; a vibration generation means installed in the case and for generating vibrations by using electric signals; a driving signal transmitting means of which the one end is connected electrically to the vibration generation means and for sending driving signals to the vibration generation means; and a sensor signal transmitting means of which the one end is connected electrically to the skin contact surface of the case and for sending biosignals detected from the skin contact surface to the outside, wherein the skin contact surface is installed to be exposed to the outer side of the wearing means; a haptic driver for applying electric signals to the haptic actuator integrated with a sensor electrode through the driving signal transmitting means; and a signal analysis means for extracting signal patterns from the biosignals delivered through the sensor signal transmitting means.

In accordance with another embodiment of the present disclosure, there is provided a wearable device, comprising a wearing means to be equipped on user's body; a haptic actuator integrated with a sensor electrode, coupled to the wearing means and comprising a case; a sensor electrode coupled to the outer side of the case for detecting biosignals; a vibration generation means installed in the case and for generating vibrations by using electric signals; a driving signal transmitting means of which the one end is connected electrically to the vibration generation means and for sending driving signals to the vibration generation means; and a sensor signal transmitting means of which the one end is connected electrically to the sensor electrode and for sending biosignals detected by the sensor electrode to the outside, wherein the sensor electrode is installed to be exposed to the outer side of the wearing means; a haptic driver for applying electric signals to the haptic actuator integrated with a sensor electrode through the driving signal transmitting means; and a signal analysis means for extracting signal patterns from the biosignals delivered through the sensor signal transmitting means.

The wearable device in accordance with the present disclosure further comprises a control signal creation means for creating and sending control signals to external electronic devices by comparing signal patterns extracted by the signal analysis means with registered control signal patterns.

In the wearable device in accordance with the present disclosure, the haptic driver comprises a signal processing means for amplifying the biosignals received from the integrated haptic actuator, removing noise from the biosignals and then sending the biosignals to the signal analysis means.

Effect of the Invention

In accordance with the present disclosure, since one actuator detects biosignals as well as provides haptic feedbacks, the cost of manufacturing a wearable device may significantly be reduced in comparison with installing haptic actuator and biosignal sensors separately.

In addition, in accordance with the present disclosure, more haptic actuators and biosignal sensors may be installed in a wearable device of a limited size, and more various haptic feedbacks and enhanced user experience may thereby be provided.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
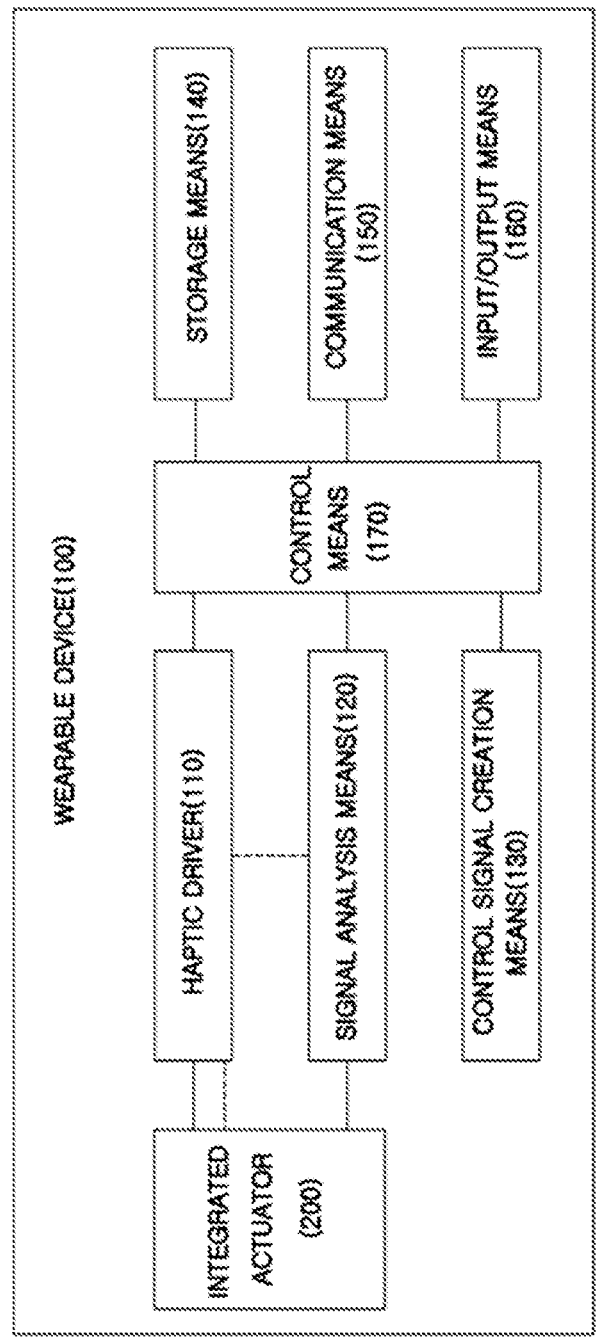
FIG. 1 is a schematic configuration of a wearable device in accordance with an embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, the embodiments of the present disclosure will be described in detail with reference to the accompanying drawings.

As shown in the schematic configuration of FIG. 1, the wearable device 100 in accordance with an embodiment of the present disclosure may include a haptic actuator integrated with a sensor electrode (hereinafter, integrated actuator) 200, a haptic driver 110, a signal analysis means 120, a control signal creation means 130, a storage means 140, a communication means 150 and an input/output means 160. In addition, it may include a battery for power supply although not shown in FIG. 1.

The integrated actuator 200 is made by integrating a haptic actuator for providing haptic feedbacks with a sensor electrode for detecting biosignals (hereinafter, sensor electrode) and a specific configuration thereof is described further below.

The haptic driver 110 converts control signals from the control means 170 for haptic feedbacks to electric signals required for driving the integrated actuator 200 and controls the operation of the integrated actuator 200.

The signal analysis means 120 analyzes electric signals detected by the sensor electrode and extracts a signal pattern from the electric signals.

Although not shown in FIG. 1, the wearable device 100 in accordance with the present disclosure preferably includes a signal processing means for amplifying electric biosignals detected by the integrated actuator 200, removing noise therefrom and then sending them to the signal analysis means 120. The signal processing means may be installed in the integrated actuator 200, or in the middle of a sensor signal transmitting means 292 in FIG. 2 connecting the integrated actuator 200 to the signal analysis means 120.

In addition, as represented with dotted lines in FIG. 1, the signal processing means may be installed in the haptic driver 110. In this case, the signal processing means in the haptic driver 110 may transmit biosignals to the signal analysis means 120 after signal processing when the biosignals detected by the integrated actuator 200 are received.

The control signal creation means 130 may compare the signal pattern extracted by the signal analysis means 120 with the registered pattern of control signals, create a control signal corresponding to the extracted signal pattern, and send the control signal to an external electronic device. The control signal creation means 130 may be omitted depending on the use of the wearable device 100.

The storage means 140 is stored with control programs and control signal patterns. In addition, it may be stored with user authentication signal patterns, electronic device authentication signal patterns, user's fingerprints, security level information, electronic device identification information, etc.

The communication means 150 performs wireless communication between the wearable device 100 and devices to be controlled. The method of wireless communication is not limited to a special method, and may be properly selected from well-known communication specifications, for example, Bluetooth, ZigBee, IrDA (Infrared DAta communication), UWB (Ultra Wide Band), NFC (Near Field Communication), WiFi, etc. depending on the type and use of devices to be controlled.

The input/output means 160 includes a user operation means, for example, buttons or a touch recognition means, a voice input means, for example, a microphone, and an output means for visually or audibly providing given information to users. The output means may include at least one of a display, a LED and a loudspeaker.

The control means 170 controls overall operation of each of the aforementioned components.

Meanwhile, the method for implementing the haptic driver 110, the signal analysis means 120, the control signal creation means 130, and the control means 170 is not limited to a specific method. Therefore, they may be implemented by software, hardware (chips, modules, circuits, etc.) or combinations of software and hardware.

In addition, one piece of hardware (chip, module, etc.) and/or software may be integrated with two or more functions. For example, the haptic driver 110 and the signal analysis means 120 may be manufactured as one chip, and the haptic driver 110 and the aforementioned signal processing means may be manufactured as one chip. In addition, the haptic driver 110, the signal analysis means 120, the control signal creation means 130 and the control means 170 may be manufactured as one chip.

In addition, the wearable device 100 in accordance with an embodiment of the present disclosure is not limited to the aforementioned configuration, and may further include a motion sensor (acceleration sensor, gyro sensor, etc.), a fingerprint sensor, a wear detection sensor, and a speech recognition sensor.

The integrated actuator 200 is described hereinafter. However, since there are many types and architectures of actuators, the embodiment of the present disclosure is described, focusing on linear resonant actuators and piezoelectric actuators for easy description in this specification. However, it should be noted that the type of actuators to apply the present disclosure is not limited to them.

Integrated Actuator in Accordance with the First Embodiment

Figure 2:
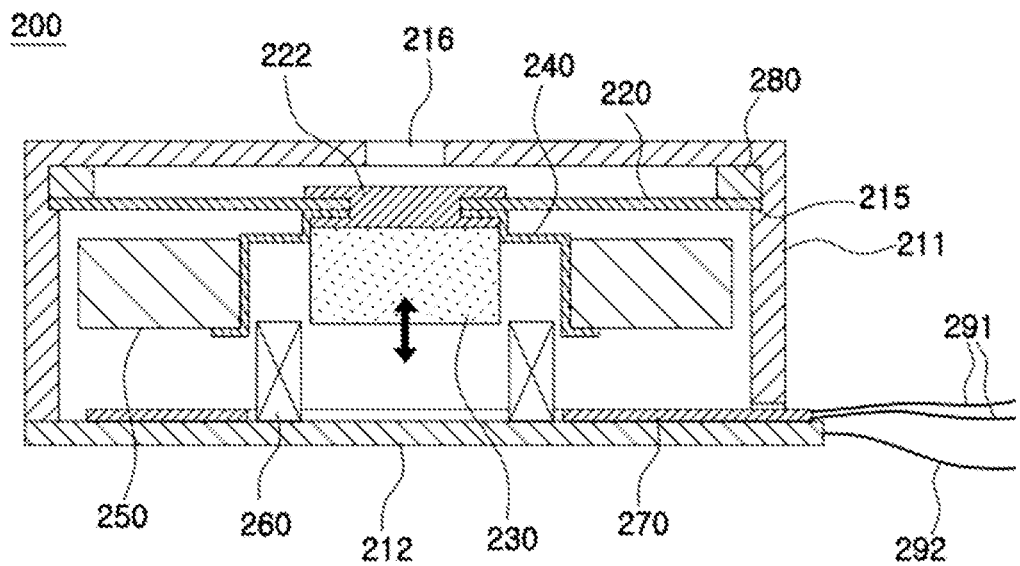
FIG. 2 is a cross sectional view of a linear resonant haptic actuator integrated with a sensor electrode in accordance with a first embodiment of the present disclosure.

FIG. 2 is a cross sectional view illustrating the architecture of the integrated actuator 200 in accordance with the first embodiment of the present disclosure, which is a linear resonant integrated actuator to use cases 211 and 212 of the integrated actuator 200 as a sensor electrode for detecting biosignals.

That is, in the first embodiment of the present disclosure, while part of the cases 211 and 212 of the integrated actuator 200 touches user's body, EMG signals occurring on the muscular surface by user's motion are detected. However, since the type of biosignals is not limited to the aforementioned biosignals, the integrated actuator 200 may be used for detecting ECG (Electrocardiogram) signals, EOG signals, EEG signals, blood pressure signals, body temperature signals, vein recognition signals, etc.

Referring to FIG. 2, the linear resonant integrated actuator 200 in accordance with the first embodiment of the present disclosure includes a cylindrical upper case 211 of which the one end is open, and a lower case 212 coupled to the open end of the upper case 211.

It is necessary that at least one of the upper case 211 or the lower case 212 is made of a conductive material, and the conductive cases 211 and 212 may closely contact with user's skin and be used as a sensor electrode. To this end, it is essential that the upper case 211 or the lower case 212 has a conductive skin contact surface capable of contacting user's skin.

The present disclosure is based on using the lower case 212 as a sensor electrode for easy description. However, it should be noted that the upper side or the lateral side of the upper case 211 may closely contact user's skin and be used as a sensor elector if the upper case 211 is conductive.

A diaphragm 220 is installed in the upper case 211, and its edge rests on a stopper 215 formed in the circumferential direction of the inner wall of the upper case 211. It is preferable to space the diaphragm 220 from the ceiling of the upper case 211 by a predetermined distance in consideration of the amplitude of the diaphragm 220. To this end, a buffer member 280 may be installed to keep a space between the upper edge of the diaphragm 220 and the upper case 211.

As described above, since the edge of the diaphragm 220 is fixed by resting on the stopper 215, vibrations of the diaphragm 220 may be delivered to the upper case 211.

A permanent magnet 230 and a yoke 240 surrounding the permanent magnet 230 are installed under the diaphragm 220. The permanent magnet 230 and the yoke 240 are coupled to the center of the diaphragm 220 by means of a coupling member 222.

A vibration unit 250 of a given weight is equipped on the outer side of the yoke 240, and the vibration unit 250 amplifies vibrations of the diaphragm 220.

A coil 260 of solenoid type having a through-hole is installed under the permanent magnet 230. The lower end of the coil 260 may be fixed to a substrate 270 equipped on the upper surface of the lower case 212, or may pass the through-hole of the substrate 270 and then be fixed to the lower case 212 as shown in FIG. 2.

The coil 260 generates electromagnetic forces depending on the electric signals applied by the haptic driver 110 to apply attraction or repulsive forces to the permanent magnet 230 located thereabove. In this process, the diaphragm 220 connected to the permanent magnet 230 vibrates.

Meanwhile, the coil 260 is connected to one end of a driving signal transmitting means 291 for delivering driving signals, and the lower case 212 is connected to one end of a sensor signal transmitting means 292 for sending detected signals to the signal analysis means 120.

The driving signal transmitting means 291 and the sensor signal transmitting means 292 correspond to a path for sending electric signals, and the method for implementing them is not limited to a special method. For example, they may be implemented by selecting or combining cables, female and male connectors, or a substrate made of a soft material or hard material with circuit patterns. In addition, they may include a circuit pattern formed on the substrate 270.

In FIG. 2, it is shown that the cable-type driving signal transmitting means 291 is connected to the substrate 270 externally projecting from the upper case 211, and the driving signal transmitting means 291 is connected electrically to the coil 260 through a circuit pattern (not shown) of the substrate 270. However, the connections are not limited to the aforementioned connections, and one end of the driving signal transmitting means 291 may be connected directly to the coil 260.

In addition, in FIG. 2, although the sensor signal transmitting means 292 is shown connected directly to the lower case 212 functioning as a sensor electrode, the method of connection is not limited thereto. Therefore, the cable-type sensor signal transmitting means 292 may be connected electrically to the lower case 212 indirectly through a circuit pattern formed on the substrate 270.

It is preferable to form a through-hole 216 through the ceiling of the upper case 211 for releasing air pressure generated when the diaphragm 220 vibrates. Although not shown in FIG. 2, a through-hole may be formed through the lower case 212 and the substrate 270 for this purpose.

In addition, although not shown inn FIG. 2, the upper case 211 and the lower case 212 may be insulated by using an insulating sealant to reduce noise in the sensor signal if both of them are made of a conductive material.

As described above, using the upper case 211 or the lower case 212 as a sensor electrode enables the integrated actuator 200 to detect biosignals as well as provide haptic feedbacks. This significantly reduces the cost of manufacturing a wearable device in comparison with the case of installing each device separately. In addition, since more actuators and sensor electrodes than conventional cases may be easily installed, the scope of actuator applications may be widened and users may be provided with more various experiences by using both actuators and sensor electrodes in more diversified ways.

Figure 3:
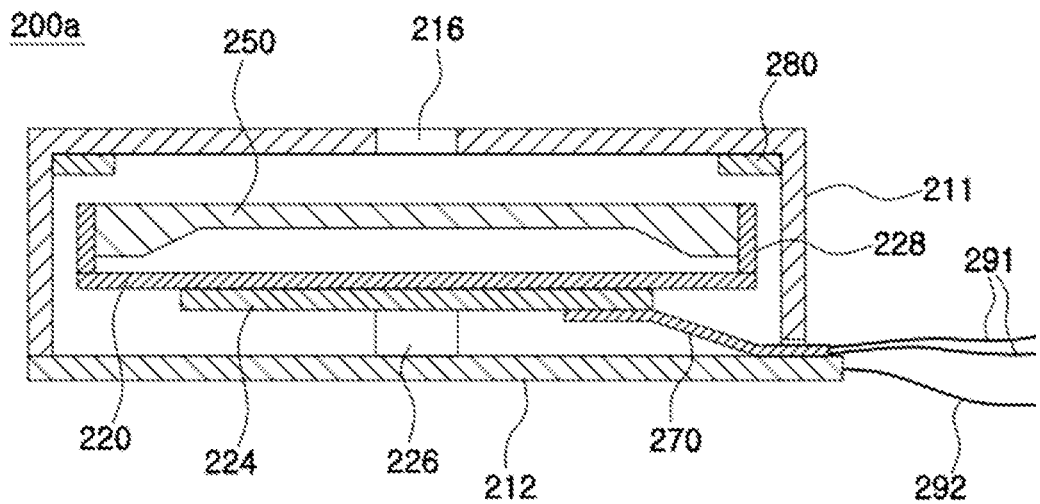
FIG. 3 is a cross sectional view of a piezoelectric haptic actuator integrated with a sensor electrode in accordance with a first embodiment of the present disclosure.

FIG. 3 is a cross sectional view of an exemplary architecture of an integrated actuator 200a by using a piezoelectric element.

Although it is the same as FIG. 2 in that the upper case 211 or the lower case 212 is used as a sensor electrode for detecting biosignals, it is different in terms of the principle of generating vibrations because a piezoelectric element is used.

Specifically, a piezoelectric element 224 is coupled to the lower side of the diaphragm 220 installed in the upper case 211, and a vibration unit 250 for amplifying vibrations is coupled to a bracket 228 installed at both edges of the diaphragm 220. The piezoelectric element 224 may be coupled to the upper surface of the diaphragm 220.

The piezoelectric element 224 repeats physical transformation and restoration in compliance with electrical signals applied by the haptic driver 110, and the diaphragm 220 coupled to the piezoelectric element 224 vibrates in this process.

The diaphragm 220 may be connected to the lower case 212 or the inner wall of the upper case 211 by using a connection member 226. The connection member 226 delivers vibrations of the diaphragm 220 to the cases 211 and 212.

It is preferable to form a through-hole 216 through the ceiling of the upper case 211 for releasing air pressure generated by vibration of the diaphragm 220. In addition, although not shown in FIG. 3, the lower case 212 may have a through-hole for the same purpose.

In addition, a buffering member 280 may be equipped against impact of the vibration unit 250 on the ceiling edge of the upper case 211.

The driving signal transmitting means 291 and the sensor signal transmitting means 292 may be connected directly or indirectly to the piezoelectric element 224 and the lower case 212, respectively, as described above.

Since the piezoelectric element 224 vibrates along with the diaphragm 220, it is preferable that the substrate 270 is made of a soft material. In this case, a circuit pattern for electrically connecting the substrate 270 made of a soft material to the piezoelectric element 224 may be formed, and the driving signal transmitting means 291 may be connected to a corresponding circuit pattern at one end of the substrate 270 projecting toward one side of the upper case 211.

As described above, if the upper case 211 is made of a conductive material in the case of FIGS. 2 and 3, the entire upper case 211 may be used as a sensor electrode. To this end, the upper case 211 is electrically connected to the sensor signal transmitting means 292.

Integrated Actuator in Accordance with the Second Embodiment

Figure 4:
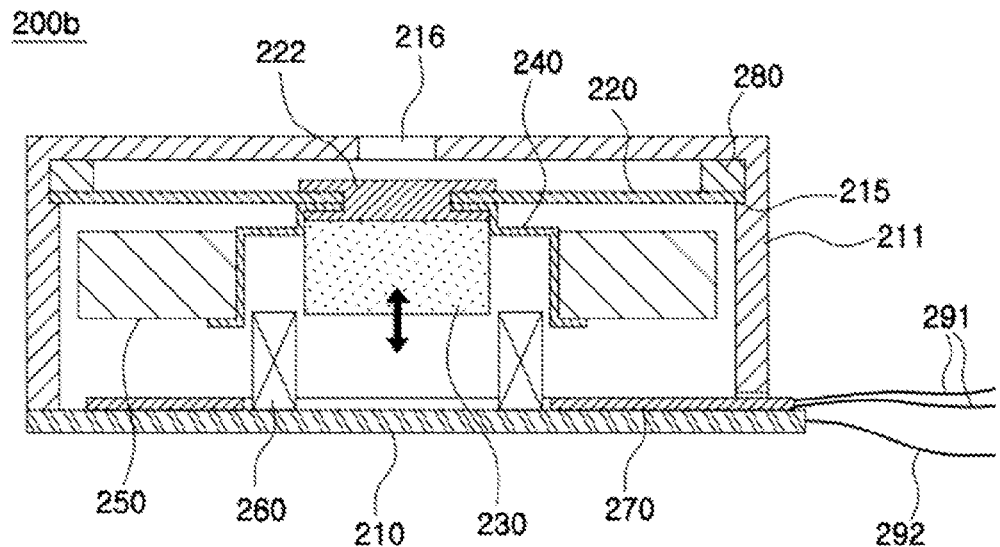
FIG. 4 is a cross sectional view of a linear resonant haptic actuator integrated with a sensor electrode in accordance with a second embodiment of the present disclosure.
Figure 5:
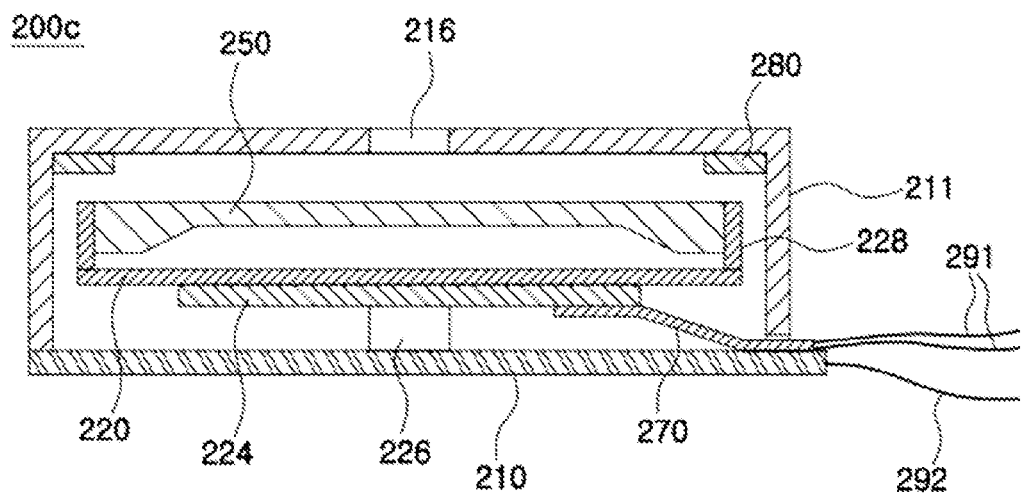
FIG. 5 is a cross sectional view of a piezoelectric haptic actuator integrated with a sensor electrode in accordance with a second embodiment of the present disclosure.

FIG. 4 is a cross sectional view of an exemplary architecture of a linear resonant integrated actuator 200b in accordance with the second embodiment of the present disclosure. FIG. 5 is a cross sectional view of an exemplary architecture of an integrated actuator 200c using a piezoelectric element in accordance with the second embodiment of the present disclosure.

The second embodiment of the present disclosure is different from the first embodiment in that a special sensor electrode 210 optimized for detecting biosignals is provided and coupled to the lower end of the upper case 211 in the second embodiment.

That is, the integrated actuators 200b and 200c in accordance with the second embodiment include a cylindrical upper case 211 of which the one end is open, and the sensor electrode 210 coupled to the one open end of the upper case 211 to act as a lower case. The sensor electrode 210 is connected electrically to the sensor signal transmitting means 292. Since the rest configuration is the same as the configuration of the first embodiment, it is not further described.

Meanwhile, on the contrary to the case of using the optimized sensor electrode 210 as a lower case, a cylindrical sensor electrode optimized for detecting biosignals and of which the one end is open may be used as an upper case 211, and the ordinary lower case 212 may be coupled to the one open end of the sensor electrode.

Integrated Actuator in Accordance with the Third Embodiment

The integrated actuators 200 and 200a in accordance with the first embodiment are intended to use the upper case 211 or the lower case 212 as a sensor electrode, and the integrated actuators 200b and 200c in accordance with the second embodiment are intended to equip the optimized sensor electrode 210 instead of using the lower case 212.

Figure 6:
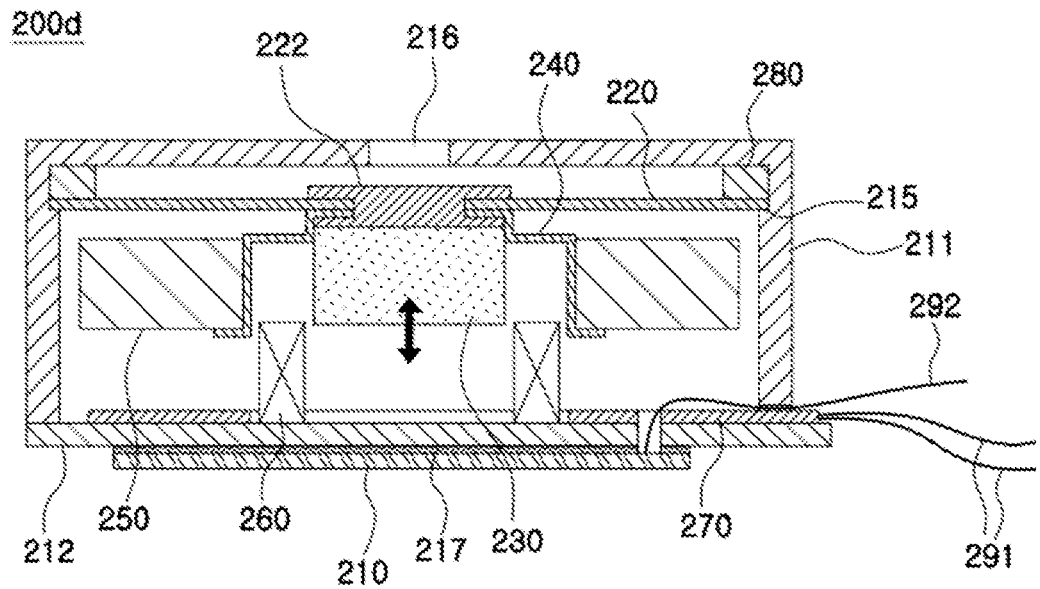
FIG. 6 is a cross sectional view of a linear resonant haptic actuator integrated with a sensor electrode in accordance with a third embodiment of the present disclosure.
Figure 7:
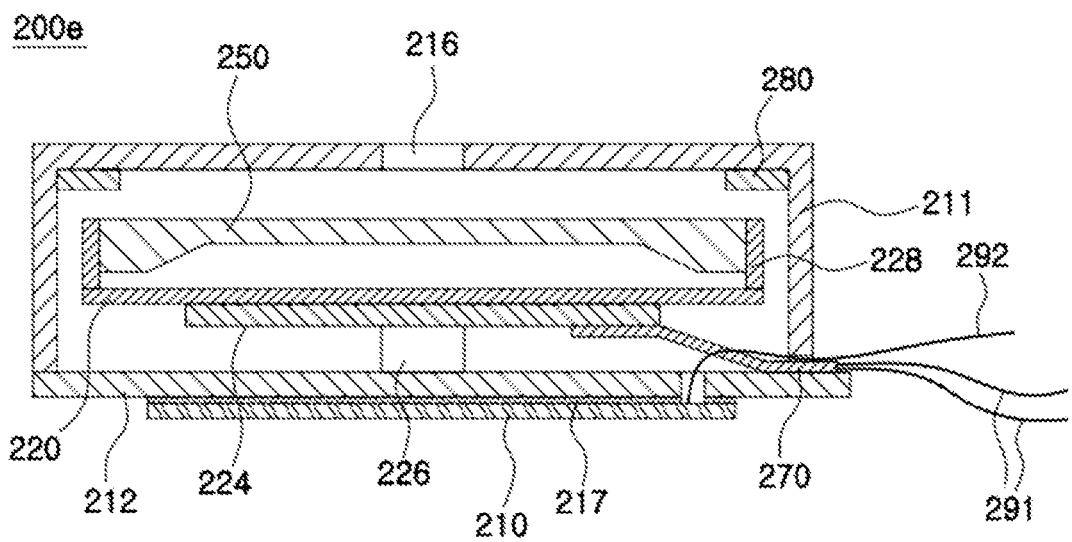
FIG. 7 is a cross sectional view of a piezoelectric haptic actuator integrated with a sensor electrode in accordance with a third embodiment of the present disclosure.
Figure 8:
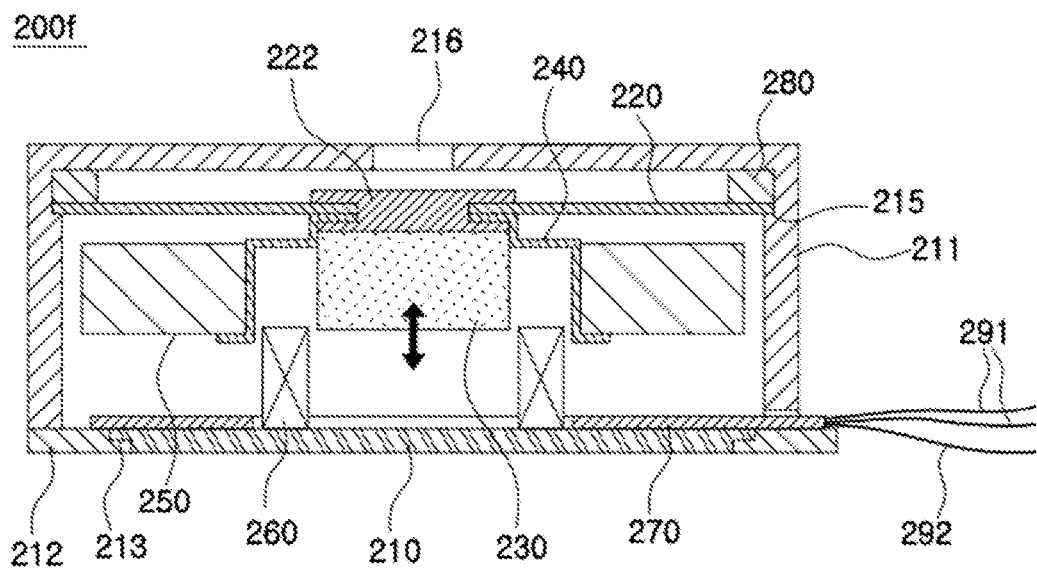
FIG. 8 is a cross sectional view of a linear resonant haptic actuator variant integrated with a sensor electrode in accordance with a third embodiment of the present disclosure.

However, the integrated actuator in accordance with the third embodiment is characterized in that an additional sensor electrode 210 is coupled to the outer side of the lower case 212 while the lower case 212 is coupled to the open lower end of the upper case 211 as shown in FIGS. 6 to 8.

First, FIG. 6 shows a linear resonant integrated actuator 200d, in which the lower case 212 is coupled to one open end of the upper case 211, and the sensor electrode 210 is coupled to the outer side of the lower case 212 by using an adhesive sheet 217. In this case, a coil 260 may be fixed to the lower case 212, or to the substrate 270.

In addition, as shown in FIG. 6, the end of sensor signal transmitting means 292 led into the integrated actuator 200d may be connected to the sensor electrode 210 through a through-hole formed through the lower case 212. On the contrary, the sensor signal transmitting means 292 may be connected directly to the sensor electrode 210 outside the integrated actuator 200d. In other cases, the sensor signal transmitting means 292 may be connected electrically to the sensor electrode 210 in various ways by using circuit patterns formed on the substrate 270.

FIG. 7 shows an integrated actuator 200e by using a piezoelectric element, in which the lower case 212 is coupled to the lower open end of the upper case 211, and the sensor electrode 210 is coupled to the outer side of the lower case 212 by using an adhesive sheet 217.

Even in this case, the sensor signal transmitting means 292 may be connected directly to the sensor electrode 210 outside the integrated actuator 200e. On the contrary, as shown in FIG. 7, the end of the sensor signal transmitting means 292 led into the integrated actuator 200e may be connected to the sensor electrode 210 through a through-hole formed through the lower case 212.

FIG. 8 shows an integrated actuator 200f in accordance with a variant of the third embodiment, in which a through-hole is formed through the lower case 212, and the sensor electrode 210 is inserted into and fixed to the through-hole. In this case, a stopper 213 for allowing the edge of the sensor electrode 210 to rest on may be formed in the lower case 212. Even in this case, the sensor signal transmitting means 292 may be connected electrically to the sensor electrode 210 in various ways as described above.

Figure 9:
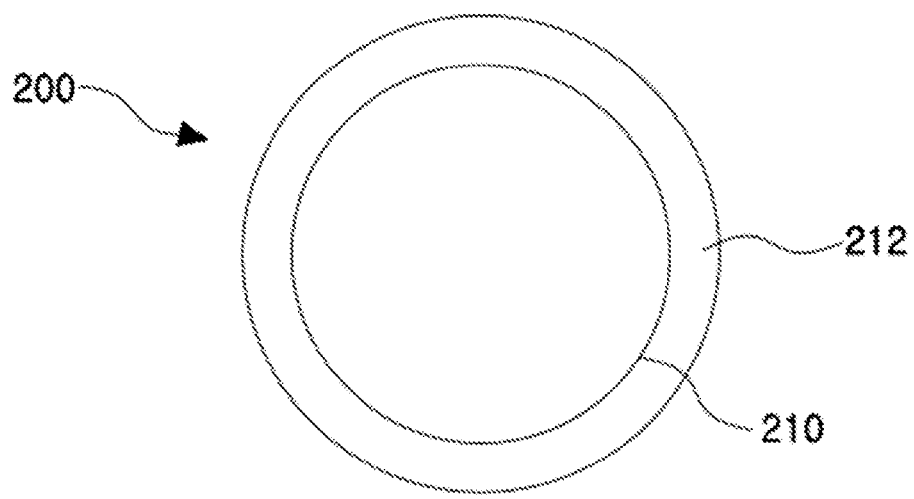
FIG. 9 shows one sensor electrode installed in a lower case.
Figure 10:
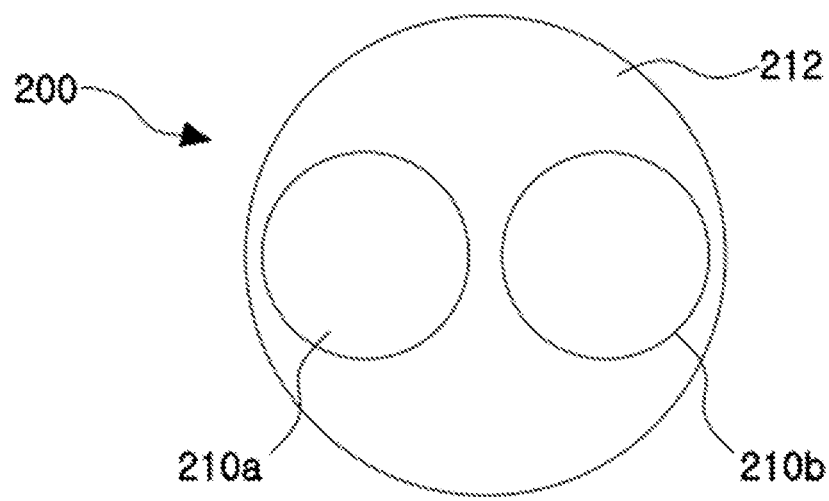
FIG. 10 shows two sensor electrodes installed in a lower case.

Meanwhile, since the sensor electrode 210 is additionally coupled to the lower case 212 in the integrated actuators 200d, 200e and 200f in accordance with the third embodiment, just one sensor electrode 210 may be coupled thereto as shown in FIG. 9, two sensor electrodes 210a and 210b as shown in FIG. 10, or more than two sensor electrodes may be coupled thereto.

If two sensor electrodes 210a and 210b are equipped as a pair in one integrated actuator 200, one of the paired sensor electrodes may be used as a reference electrode and the other thereof may be used as a measuring electrode.

The above description is based on the case that the sensor electrode 210 is coupled to the outer side of the lower case 212 in the integrated actuators 200d, 200e and 200f in accordance with the third embodiment. However, since it is necessary to equip the sensor electrode 210 on a location to contact wearer's body, the sensor electrode 210 may be equipped on the upper side or lateral side of the upper case 211 corresponding to the opposite side of the lower case 212 depending on the architecture of the integrated actuators 200d, 200e and 200f.

Figure 11:
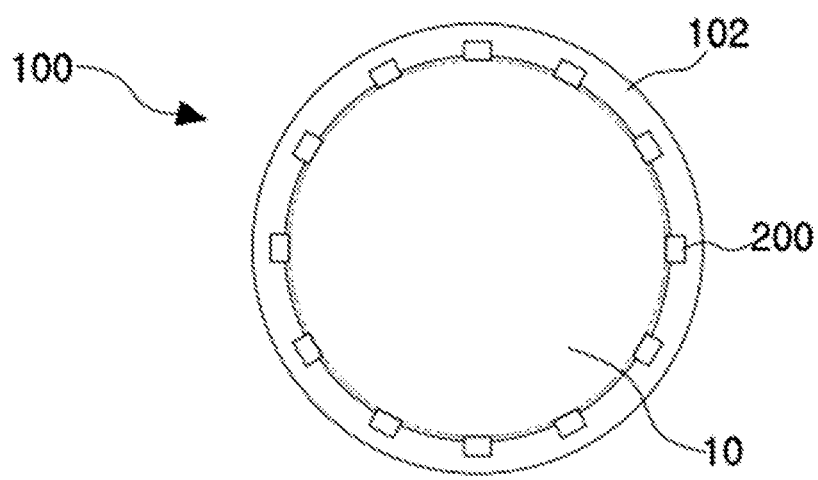
FIG. 11 shows a wrist-worn wearable device in accordance with an embodiment of the present disclosure.

FIG. 11 shows an exemplary wearable device 100 equipped with integrated actuator 200 in accordance with an embodiment of the present disclosure. In this case, the skin contact surface of the sensor electrode 210 or the cases 211 and 212 used as a sensor electrode may slightly project from the inner surface of a wearing means 102 surrounding a wrist 10 to enable the skin contact surface of the sensor electrode 210 or the cases 211 and 212 used as a sensor electrode to contact user's skin. The type of the wearing means 102 is not specially limited to a specific type.

As described above, wearable device 100 equipped with a plurality of integrated actuators 200 may detect user's biosignals in various locations, obtain various status information based on the biosignals, control external electronic devices on the basis of user's motion, and provide various feedbacks.

Figure 12:
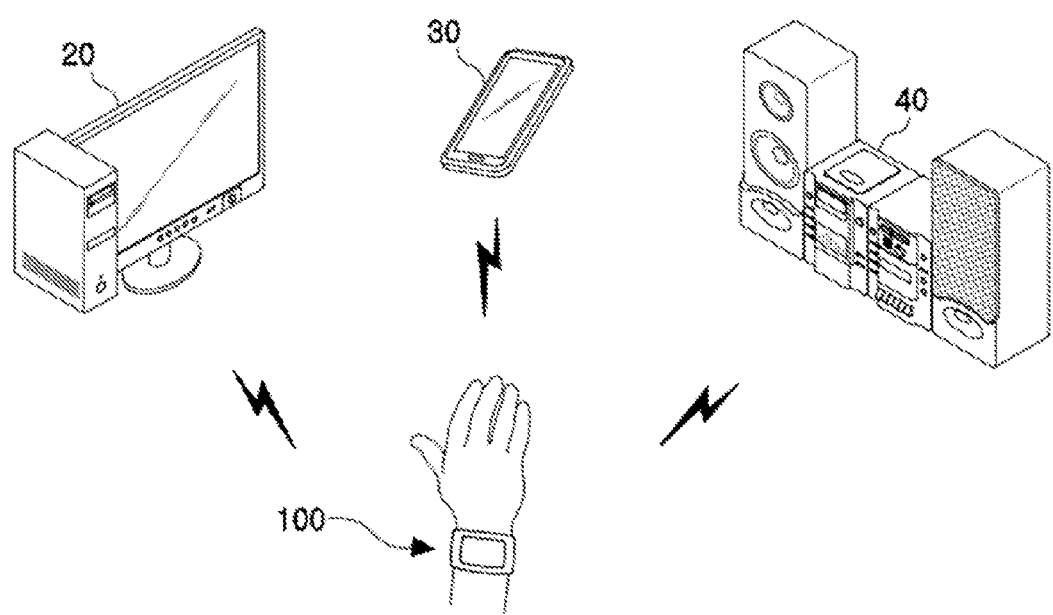
FIG. 12 shows external electronic devices controlled by a wearable device in accordance with an embodiment of the present disclosure.

FIG. 12 illustrates the status of using a wearable device 100 to show how to control the operation of various electronic devices 20, 30 and 40 by using biosignals (for example, EMG) while the wearable device 100 is worn on the user's body. Although the wearable device 100 is wrist-worn in FIG. 12, this is just an example, and the wearable device 100 may be placed on other body portions, for example, user's upper limbs, lower limbs, neck, head, etc.

The type of electronic devices to be controlled is not limited to a specific type, and may include, for example, computers and their peripheral devices, personal devices including mobile phones, tablet PCs, MP3 players and e-diaries, PDA, consumer electronics including TVs, air conditioners, audio players, video players, refrigerators, washing machines and vacuum cleaners, heating appliances, lighting appliances, communication devices, home networking devices, electronic door locks and the like. In addition, exemplary electronic devices to be controlled may include devices equipped on vehicles, devices for convenience, rehabilitation devices and the like.

Although embodiments of the present disclosure are described in the above, the present disclosure is not limited to the aforementioned embodiments, and may be modified or changed into various types and implemented.

For example, the linear resonant integrated actuators and the integrated actuators by using a piezoelectric element are described in this specification. By the way, since the specific shape or architecture of haptic actuators is quite varied depending on the method for driving them or their manufacturers, it should be noted that the scope of the present disclosure is not limited to the architectures shown in the drawings.

In addition, even the type of actuators is not limited to the linear resonant actuators or the piezo actuators. For one example, an eccentric motor actuator can be used. In this case, the sensor electrode may be equipped outside of the actuator case, or the eccentric motor integrated actuators may be configured to use the case surface as a sensor electrode. For another example, film type actuator or polymer type actuator can be used. In other cases, the actuators may be modified or changed into various types depending on actual applications or use thereof.

As described above, the present disclosure may be modified or changed into various types and implemented. It should be noted that even modified or changed embodiments belong to the scope of the present disclosure as long as they include the technical ideas of the present disclosure disclosed in the following Claims.

DESCRIPTION OF NUMERALS

| | |
|---|---|
| 100: wearable device | 102: wearing means |
| 110: haptic driver | 120: signal processing means |
| 130: signal creation means | 140: storage means |
| 150: communication means | 160: input/output means |
| 170: control means | 200: haptic actuator integrated with a sensor electrode |
| 210: sensor electrode | 211: upper case |
| 212: lower case | 213, 215: stopper |
| 216: through-hole | 217: adhesive sheet |
| 220: diaphragm | 222: coupling member |
| 224: piezoelectric element | 226: connection member |
| 228: bracket | 230: permanent magnet |
| 240: yoke | 250: vibration unit |
| 260: coil | 270: substrate |
| 280: buffering member | 291: driving signal transmitting means |
| 292: sensor signal transmitting means | |

What is claimed is:

1. A haptic actuator integrated with a sensor electrode, the haptic actuator comprising:
    a haptic actuator case comprising a skin contact surface made of a conductive material;
    a vibration generator installed in the haptic actuator case for generating vibrations by using electric signals;
    a driving signal transmitter of which one end is connected electrically to the vibration generator for sending driving signals to the vibration generator;
    a sensor signal transmitter of which one end is connected electrically to the skin contact surface of the haptic actuator case for sending biosignals detected from the skin contact surface to the outside; and
    a signal processor installed in the haptic actuator case for amplifying detected biosignals and removing noise therefrom.

2. The haptic actuator of claim 1, wherein the haptic actuator case comprises:
    a cylindrical upper case of which the one end is open; and
    the sensor electrode coupled to the one open end of the upper case and having the skin contact surface; and
    the sensor signal transmitter is connected to the sensor electrode.

3. The haptic actuator of claim 1, wherein the haptic actuator case comprises:
    the sensor electrode in a shape of a cylinder with one open end and having the skin contact surface; and
    a lower case coupled to one open end of the sensor electrode; and
    the sensor signal transmitter is connected to the sensor electrode.

4. A haptic actuator integrated with a sensor electrode, the haptic actuator comprising:
    a haptic actuator case;
    the sensor electrode coupled to an outer side of the haptic actuator case for detecting biosignals;
    a vibration generator installed in the haptic actuator case for generating vibrations by using electric signals;
    a driving signal transmitter of which one end is connected electrically to the vibration generator for sending driving signals to the vibration generator;
    a sensor signal transmitter of which one end is connected electrically to the sensor electrode for sending biosignals detected by the sensor electrode to an outside; and
    a signal processor installed in the haptic actuator case for amplifying detected biosignals and removing noise therefrom.

5. The haptic actuator of claim 4, wherein the haptic actuator case has a through-hole, and the sensor electrode is inserted into and coupled to the through-hole.

6. The haptic actuator of claim 1, wherein the vibration generator comprises:
    a diaphragm installed in the haptic actuator case and of which an edge contacts the haptic actuator case;
    a permanent magnet coupled to the diaphragm; and
    a coil connected electrically to the driving signal transmitter and for applying electromagnetic forces to the permanent magnet.

7. The haptic actuator of claim 4, wherein the vibration generator comprises:
    a diaphragm installed in the haptic actuator case and of which an edge contacts the haptic actuator case;
    a permanent magnet coupled to the diaphragm; and
    a coil connected electrically to the driving signal transmitter and for applying electromagnetic forces to the permanent magnet.

8. The haptic actuator of claim 1, wherein the vibration generator comprises:
a diaphragm installed in the haptic actuator case; and
a piezoelectric element coupled to one side of the diaphragm and connected electrically to the driving signal transmitter.

9. The haptic actuator of claim 4, wherein the vibration generator comprises:
a diaphragm installed in the haptic actuator case; and
a piezoelectric element coupled to one side of the diaphragm and connected electrically to the driving signal transmitter.

10. A wearable device, the device comprising:
a wearing object to be equipped on a user's body;
a haptic actuator integrated with a sensor electrode, coupled to the wearing object and comprising:
a haptic actuator case comprising a skin contact surface made of a conductive material;
a vibration generator installed in the haptic actuator case for generating vibrations by using electric signals;
a driving signal transmitter of which the one end is connected electrically to the vibration generation means and for sending driving signals to the vibration generator; and
a sensor signal transmitter of which one end is connected electrically to the skin contact surface of the haptic actuator case for sending biosignals detected from the skin contact surface to an outside,
wherein the skin contact surface is installed to be exposed to an outer side of the wearing object;
a haptic driver for applying electric signals to the haptic actuator through the driving signal transmitter; and
a signal analyzer for extracting signal patterns from the biosignals delivered through the sensor signal transmitter.

11. A wearable device, the device comprising:
a wearing object to be equipped on a user's body;
a haptic actuator integrated with a sensor electrode, coupled to the wearing means and comprising:
a haptic actuator case;
the sensor electrode coupled to an outer side of the haptic actuator case for detecting biosignals;
a vibration generator installed in the haptic actuator case for generating vibrations by using electric signals;
a driving signal transmitter of which one end is connected electrically to the vibration generator for sending driving signals to the vibration generator; and
a sensor signal transmitter of which one end is connected electrically to the sensor electrode for sending biosignals detected by the sensor electrode to an outside,
wherein the sensor electrode is installed to be exposed to the outer side of the wearing object;
a haptic driver for applying electric signals to the haptic actuator through the driving signal transmitter; and
a signal analyzer for extracting signal patterns from the biosignals delivered through the sensor signal transmitter.

12. The wearable device of claim 10, further comprising:
a control signal generator for creating and sending control signals to external electronic devices by comparing signal patterns extracted by the signal analyzer with registered control signal patterns.

13. The wearable device of claim 11, further comprising:
a control signal generator for creating and sending control signals to external electronic devices by comparing signal patterns extracted by the signal analyzer with registered control signal patterns.

14. The wearable device of claim 10, wherein the haptic driver comprises a signal processor for amplifying the biosignals received from the haptic actuator, removing noise from the biosignals and sending the biosignals to the signal analyzer.

15. The wearable device of claim 11, wherein the haptic driver comprises a signal processor for amplifying the biosignals received from the haptic actuator, removing noise from the biosignals and sending the biosignals to the signal analyzer.

16. The wearable device of claim 10, wherein a plurality of the haptic actuators are installed, and the biosignals detected by the haptic actuators are EMG (Electromyogram) signals, ECG (Electrocardiogram) signals, EEG (Electroencephalogram) signals, blood pressure signals, pulse signals, body temperature signals or vein recognition signals.

17. The wearable device of claim 11, wherein a plurality of the haptic actuators are installed, and the biosignals detected by the haptic actuators are EMG (Electromyogram) signals, ECG (Electrocardiogram) signals, EEG (Electroencephalogram) signals, blood pressure signals, pulse signals, body temperature signals or vein recognition signals.

\* \* \* \* \*